United States Patent [19]

Kiuchi et al.

[11] Patent Number: 4,806,367
[45] Date of Patent: Feb. 21, 1989

[54] PROCESS FOR THE PRODUCTION OF A FOOD MATERIAL

[75] Inventors: Hiroshi Kiuchi, Saitama; Katsumi Murata; Kazuo Murakami, both of Ibaraki; Isao Kusakabe, Chiba; Hideyuki Kobayashi, Ibaraki, all of Japan

[73] Assignees: Kabushikikaisha Kibun; Kabushikikaisha Kibun Foodchemifa, both of Tokyo, Japan

[21] Appl. No.: 55,523

[22] Filed: May 29, 1987

[30] Foreign Application Priority Data

Jun. 20, 1986 [JP] Japan .................. 61-142765

[51] Int. Cl.$^4$ .................. A23L 1/20; A23J 1/14
[52] U.S. Cl. .................. 426/46; 426/52; 426/63; 426/74; 426/634; 426/656
[58] Field of Search .................. 426/46, 34, 52, 63, 426/74, 634, 656, 598, 599, 573

[56] References Cited

U.S. PATENT DOCUMENTS

| | | | |
|---|---|---|---|
| 2,802,738 | 8/1957 | Anson et al. | 426/46 |
| 4,302,473 | 11/1981 | Mikami et al. | 426/46 |
| 4,482,577 | 11/1984 | Lee | 426/46 |

FOREIGN PATENT DOCUMENTS

| | | | |
|---|---|---|---|
| 0087753 | 5/1985 | Japan | 426/74 |
| 1170384 | 8/1986 | Japan | 426/46 |

Primary Examiner—Marianne Cintins
Attorney, Agent, or Firm—Browdy & Neimark

[57] ABSTRACT

Soybean milk is treated with protease at a pH in the range which does not cause acid coagulation in the presence of a magnesium salt as a concentration in the range which does not substantially cause magnesium coagulation, to flocculate protein in soybean milk, thereby a food material having good mouthfeel and high processability may be obtained.

6 Claims, No Drawings

PROCESS FOR THE PRODUCTION OF A FOOD MATERIAL

FIELD OF THE INVENTION

This invention relates to a process for the production of a food material from soybean milk, and more specifically, it relates to a process for the production of a food material having good processability.

BACKGROUND OF THE INVENTION

In general, soybean protein has become to be used as a protein material for ice cream, yogurt, cheese, dressing etc. and has also become to be used in other food products such as fish paste products, household dishes, cakes, bread, noodles, various dairy products etc., and soybean protein has become a very promissing product as a food material.

However, where such soybean protein is used as a food material, it should have good mouthfeel and high processability.

Heretofore, as the process for producing a food material from soybean protein, there have been, for example, an acid coagulation process, a calcium coagulation process, a magnesium coagulation process, an enzyme process, a heating process, an alcohol flocculation process, etc.

However, the food materials obtained by these conventional processes had many problems, for example, the acid taste remained, a salty taste was manifested, or a bitter taste was imparted, the coagulation was too strong to give rough mouthfeel, the processability was poor, and so forth.

SUMMARY OF THE INVENTION

The present inventors have been intensively studying in pursuit of a curd-like protein food material having rich flavors and smooth mouthfeel, and have attained this purpose by subjecting soybean milk to protease in the presence of a magnesium salt at a concentration at which protein does not coagulate with magnesium.

Accordingly, this invention is a process for the production of a food material which is characterized by treating soybean milk with protease at a pH in the range which does not cause acid coagulation in the presence of a magnesium salt at a concentration in the range which does not cause magnesium coagulation, to flocculate it.

DETAILED DESCRIPTION OF THE INVENTION

As the starting material for this invention, soybean milk produced from soybean, defatted soybean, concentrated soybean protein, separated soybean protein etc. may be used, and any soybean milk, for example, commercially available soybean milk containing auxiliary starting materials such as oil etc. may also be used.

Then, an example of the process for the production of soybean milk is illustrated. First, dried soybean is swollen in water, drained, then after adding a 0.1% baking powder solution, it is ground to make into a liquid, then filtered, and the filtrate is taken out to yield soybean milk containing about 4% of protein.

In general, soybean protein coagulates at pH 3.4–5.8 and strongly coagulates at pH 4–5, and therefore, it is necessary in this invention to exclude the coagulation due to the pH. It is preferred to adjust the pH to higher than 5.8.

Further, soybean protein coagulates and precipitates with magnesium, and therefore, it is necessary in this invention that magnesium be present at a concentration in the range which does not substantially cause magnesium coagulation. Examples of the magnesium salt used in this invention include magnesium sulfate, magnesium chloride, brine etc. The solution of soybean protein brings about strong coagulation and precipitation if the magnesium concentration exceeds 20 mM as the magnesium salt. Slight precipitation takes place even at 10 mM or above, but since it does not lead to substantial coagulation, the concentration range which does not substantially cause magnesium coagulation is preferably not greater than 15 mM and not lower than 0.1 mM as magnesium sulfate.

In this invention, it is an essential requirement that magnesium be present in the solution of soybean protein, and since the amount of magnesium somewhat varies depending on the process for producing soybean milk, the temperature for the reaction with protease, etc., it is necessary to determine the concentration range which does not substantially cause magnesium coagulation according to the respective conditions.

In this invention, by making magnesium present in the solution of soybean protein and then adding various proteases to treat, it is possible to promot flocculation of protein and obtain a protein flocculate which has good processability as a food material.

As the protease, any of e.g. alkaline proteases (protease of subtilysin, Aspergillus soya etc.), neutral proteases (thermolysin protease etc.), acidic proteases (protease of Endothia mucor etc.) may be used. Further, vegetable bromelain, papain etc. may also be used.

The amount of the protease added may be any which causes protein flocculation, and preferably the addition of 0.002–0.2% of an enzyme preparation will be satisfactory.

The protein flocculation reaction is suitably effected at elevated temperatures such as 30°–90° C., preferably 45°–85° C., although it can be at normal temperature. Stirring is optional.

The time required for protein coagulation considerably varies depending on the concentration of protease etc.; flocculation starts several seconds to about 20 minutes after mixing of protease and soybean milk, and protein will have completely flocculated in about 10–15 minutes.

On the contrary, if flocculation is attempted similarly but using protease without making magnesium present, it takes a time several times to several tens of times for protein flocculation.

The resultant flocculated protein may be separated by e.g. centrifugation, filtration etc., and this may also be dried by various drying means.

The product obtained by such a process may be reconstituted by adding water to give a good gel, and it is suitable as a food material. The food material obtained in this invention may be advantageously used in ice cream, yogurt, cheese, dressing etc. mainly starting from vegetable proteins, and also is good as an additive for fish paste products, household dishes, cakes, bread, various dairy products, noodles etc.

Examples of this invention are given below.

EXAMPLE 1

Citric acid was added to one kg of soybean milk (protein 4.2%, pH 6.73) warmed to 65° C. to adjust the pH to 6.1, then a 0.5 M magnesium chloride aqueous solution was added to give a concentration of 3.0 mM in soybean milk, further a neutral protease preparation (Neutrase) (produced by Novo Industry Co., Ltd.) was added in an amount of 0.02%, the mixture was stirred, allowed to stand at 65° C. for 15 minutes, and centrifuged (2700 rpm) to obtain a protein flocculate having a water content of about 80%.

EXAMPLE 2

A 0.5 M magnesium sulfate aqueous solution was added to one kg of soybean milk (protein 4.2%, pH 6.73) warmed to 70° C. to give a concentration of 5.0 mM in soybean milk, further a protease preparation, Protin AC10F (produced by Yamato Kasei Co., Ltd.) was added in an amount of 0.05%, the mixture was stirred, then allowed to stand at 70° C. for 15 minutes, and thereafter centrifuged (3000 rpm) to obtain a protein flocculate having a water content of about 80%.

What is claimed is:

1. A process for flocculating protein in soybean milk by treating said soybean milk, at a pH higher than 5.8, in the presence of 0.1 to 15 mM of magnesium in the form of a magnesium salt, with an amount of protease effective to flocculate said soybean protein, the concentration of said magnesium salt also being below that necessary to effect magnesium coagulation.

2. The process of claim 1, wherein said treating with protease is performed by adding said protease to said soybean milk in an amount of 0.002 to 0.2%.

3. The process of claim 2, wherein protein flocculation is effected at 30°–90° C.

4. The process of claim 3, wherein protein flocculation is continued for about 10–15 minutes after the initiation thereof.

5. The process of claim 3, wherein the protein flocculation is effected at 45°–85° C.

6. The process of claim 5, wherein protein flocculation is continued for about 10–15 minutes after the initiation thereof.

* * * * *